F. ZIEGLER.
SYSTEM OF LUBRICATION.
APPLICATION FILED OCT. 8, 1912.
1,113,081.
Patented Oct. 6, 1914.
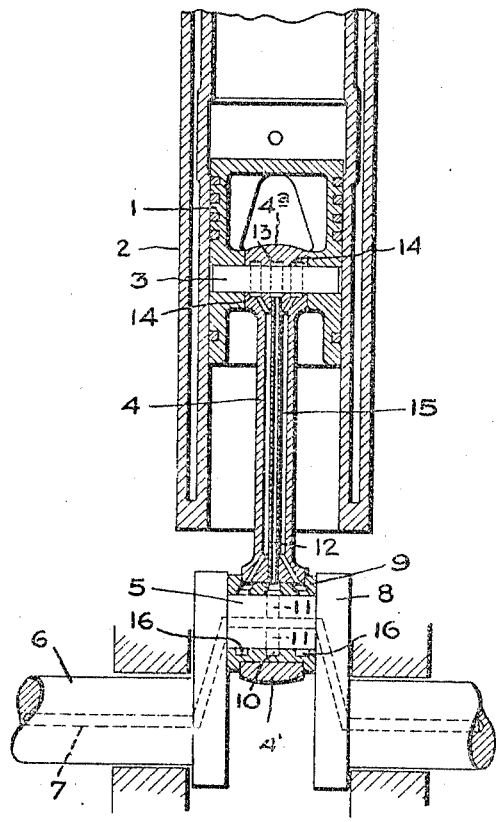
Witnesses:
Marcus L. Byng
Anthony E. Marr
Inventor,
Friedrich Ziegler,
by Albert G. Davis
Att'y.

UNITED STATES PATENT OFFICE.

FRIEDRICH ZIEGLER, OF CHARLOTTENBURG, GERMANY, ASSIGNOR TO GENERAL ELECTRIC COMPANY, A CORPORATION OF NEW YORK.

SYSTEM OF LUBRICATION.

1,113,081.  Specification of Letters Patent.  Patented Oct. 6, 1914.

Application filed October 8, 1912. Serial No. 724,544.

*To all whom it may concern:*

Be it known that I, FRIEDRICH ZIEGLER, a subject of the Emperor of Germany, residing at Charlottenburg, Germany, have invented certain new and useful Improvements in Systems of Lubrication, of which the following is a specification.

This invention relates to systems of lubrication wherein a lubricant is supplied under pressure to two or more points requiring lubrication. The system relates more particularly to such a system wherein the fresh lubricant is supplied at points intermediate between the ends of the bearings and is collected and again applied at points adjacent the outer end of one or more of such bearings. By this arrangement the middle of each bearing is continuously furnished with the fresh lubricant, an arrangement which is decidedly advantageous, and an economical and efficient use of the lubricant results.

In the accompanying drawing the invention is shown applied to a connecting rod in an internal combustion engine, the figure being a longitudinal section of a portion of a cylinder with its piston, connecting rod and crank-shaft.

The piston 1 moves in a cylinder 2 and is provided with a wrist-pin 3 for the upper end 4ª of the connecting rod 4. The lower end 4ᵇ of said rod engages the crank-pin 5 of a crank-shaft 6 which has a longitudinal duct 7 extending up through the crank-arms 8 and lengthwise through the pin. In the brasses 9 which surround the crank-pin are three circumferential grooves, the middle one 10 being in constant communication with radial holes 11 in the pin extending from the duct 7 to its periphery. A pipe 12, opening into the groove 10, runs up through the connecting rod to an intermediate groove 13 in the upper head 4ª of said rod surrounding the wrist-pin 3. On each side of this groove 13, near the ends of the bearing in said head, are collecting grooves 14, communicating with one or more longitudinal passages 15 in the rod, which in turn deliver into outer or side circumferential grooves 16 near the ends of the brasses 9. I prefer to make the passage 15 annular, concentric with the pipe 12.

The oil forced through the duct 7 flows through the radial holes 11 to the middle of the crank-pin 5, where some of it is used for lubrication. A portion of it is forced up through the pipe 12 to the middle of the bearing on the wrist-pin 3. Here it spreads both ways along said pin until caught by the collecting grooves 14, from which it is conducted by the passage 15 to the grooves 16 near the ends of the crank-pin. This used oil, coming to the grooves 16, cannot work back to the middle of the crank-pin because of the fresh oil constantly being delivered there at quite high pressure.

It is evident that the number of lubricating points may be increased, and that a number of longitudinal passages may be provided in the rod. If applied to a single cylinder engine, the duct 7 may come in at only one side of the crank.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a plurality of bearings of means for supplying lubricant under pressure at points intermediate between the ends of said bearings, and means for collecting the used lubricant from one of said bearings and directing it to points adjacent the ends of another of said bearings.

2. The combination of a pair of bearings, a connecting rod joining said bearings, means for supplying lubricant under pressure at points intermediate between the ends of each of said bearings and means for collecting the used lubricant from one of said bearings and applying it at points adjacent the ends of the other of said bearings, said last named means including a passage carried by the connecting rod.

3. The combination with a connecting rod, wrist pin, and crank pin, of means for supplying lubricant under pressure to the middle of each of said pins, and a passage in said connecting rod for conveying used lubricant from said wrist pin to points adjacent the ends of said crank pin.

4. The combination with a connecting rod, wrist-pin and crank-pin, of means for supplying fresh lubricant to the middle of said crank-pin, and passages in said rod for conveying lubricant from the crank-pin to the wrist-pin and back to the ends of the crank-pin.

5. The combination with a wrist-pin, of a connecting rod having a head provided with circumferential grooves surrounding said pin, a crank-shaft and pin having a duct for lubricant, radial holes in said pin, a bearing for said rod having a circumferential groove communicating with said holes, a pipe in said rod leading from said groove to an intermediate groove in the head of the rod, a passage conducting lubricant back from collecting grooves in said head to the bearing on the crank-pin, and outer grooves in said bearing with which said passage connects.

In witness whereof I have hereunto set my hand this 19th day of September, 1912.

FRIEDRICH ZIEGLER

Witnesses:
 BERNHARD KRÄMER,
 H: DECHAMPS.